United States Patent
Cho et al.

(10) Patent No.: US 7,978,201 B2
(45) Date of Patent: Jul. 12, 2011

(54) METHOD FOR COMPENSATING AN IMAGE

(75) Inventors: Sung-Dae Cho, Yongin-si (KR);
Seok-Jin Won, Seongnam-si (KR);
Jung-Hoon Park, Suwon-si (KR);
Young-Min Jeong, Suwon-si (KR);
Jae-Won Moon, Bucheon-si (KR);
Yun-Je Oh, Yongin-si (KR); Young-Ho Ha, Daegu (KR); Jong-Man Kim, Daegu (KR); Cheol-Hee Lee, Daegu (KR); Chang-Hwan Son, Daegu (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 1334 days.

(21) Appl. No.: 11/519,598

(22) Filed: Sep. 12, 2006

(65) Prior Publication Data
US 2007/0070091 A1 Mar. 29, 2007

(30) Foreign Application Priority Data

Sep. 29, 2005 (KR) .................. 10-2005-0091342

(51) Int. Cl.
| *G09G 5/02* | (2006.01) |
| *G09G 5/10* | (2006.01) |
| *G09G 5/00* | (2006.01) |
| *H04N 5/57* | (2006.01) |
| *H04N 1/46* | (2006.01) |
| *G06K 9/40* | (2006.01) |
| *G02B 27/00* | (2006.01) |
| *G09G 3/30* | (2006.01) |
| *H04N 7/18* | (2006.01) |
| *G06K 9/20* | (2006.01) |
| *G02B 1/10* | (2006.01) |

(52) U.S. Cl. ........ 345/581; 345/589; 345/606; 345/207; 345/77; 348/68; 348/602; 358/504; 358/509; 382/254; 382/274; 382/300; 382/312; 359/577; 359/584

(58) Field of Classification Search ............... 345/426, 345/428, 581, 586, 589, 606, 616–618, 639, 345/643, 207, 690, 77; 348/68, 602, 687; 358/504, 509, 510, 514; 382/254, 274, 276, 382/300, 312; 356/300–301, 317, 341
See application file for complete search history.

(56) References Cited

U.S. PATENT DOCUMENTS 5,050,990 A * 9/1991 Smith et al. ............. 356/326

(Continued)

FOREIGN PATENT DOCUMENTS

EP 1009161 A2 6/2000

(Continued)

OTHER PUBLICATIONS

Dowling, John E.; "The Retina, An Approachable Part of The Brain;" 1987; ISBN: 0-674-76680-6; rtrvd from internet: < http://books.google.com/books?id=DDNnUZYOi0QC >; XP002534645.

(Continued)

Primary Examiner — Wesner Sajous
(74) Attorney, Agent, or Firm — Cha & Reiter, LLC

(57) ABSTRACT

A method for compensating an image produced by image means for implementing image information takes account of ambient illumination. Luminance of external background illumination around the image means is measured. The measured luminance of the background illumination is compared with preset tristimulus values and a reflectance factor of the image means, a comparison result is computed, and a control signal is generated to compensate luminance and chroma of an image. Luminance and chroma of the image means are compensated in response to the control signal.

5 Claims, 8 Drawing Sheets

U.S. PATENT DOCUMENTS

| | | | |
|---|---|---|---|
| 6,362,888 B1 * | 3/2002 | Jung et al. | 356/419 |
| 7,240,839 B2 * | 7/2007 | Jung et al. | 235/454 |
| 2001/0050757 A1 | 12/2001 | Yoshida et al. | |
| 2002/0024529 A1 | 2/2002 | Miller et al. | |
| 2003/0052868 A1 * | 3/2003 | Kagawa et al. | 345/204 |
| 2010/0043706 A1 * | 2/2010 | Jung et al. | 118/712 |

FOREIGN PATENT DOCUMENTS

| | | |
|---|---|---|
| EP | 1558020 | 7/2005 |
| JP | 2001-238091 | 8/2001 |
| JP | 2003-304551 | 10/2003 |
| JP | 2003-323610 | 11/2003 |
| JP | 2003-339056 | 11/2003 |
| JP | 2005-204136 | 7/2005 |
| KR | 2005-64444 | 6/2005 |

OTHER PUBLICATIONS

Katoh, Naoya, et al.; "An Accurate Characterization of CRT Monitor (I) Verifications of Past Studies and Clarifications of Gamma;" Optical Review, Springer, Berlin, DE, vol. 8, No. 5; Sep. 1, 2001; XP019353909.

Lee, Seongdeok, et al.; Patent Application Publication No. US 2005/0110906 A1; Publication Date: May 26, 2005; "Method and Apparatus For Compensating For Luminance of Color Signal;" . . .

Choe, Won-Hee, et al.; Patent Application Publication No. US 2004/0013298 A1; Publication Date: Jan. 22, 2004; "Method and Apparatus For Adaptively Enhancing Colors In Color Images;" . . .

Lee, Seong-deok, et al.; Patent Application Publication No. US 2003/0122845 A1; Publication Date: Jul. 3, 2003; "Apparatus and Method of Controlling Brightness of Image;" . . .

* cited by examiner

METHOD FOR COMPENSATING AN IMAGE

CLAIM OF PRIORITY

This application claims priority under 35 U.S.C. §119 to an application entitled "Method for Compensating an Image," filed in the Korean Intellectual Property Office on Sep. 29, 2005 and assigned Serial No. 2005-91342, the contents of which are incorporated herein by reference.

BACKGROUND

1. Field of the Invention

The present invention generally relates to a digital device, and more particularly to a digital device with image means that is portable in an outdoor area and can provide information in an image form.

2. Description of the Related Art

With the development of electronic and digital technologies, digital devices are being supplied in various personal, portable forms, such as a navigation system, personal digital assistant (PDA), portable phone, notebook computer, electronic dictionary, Motion Pictures Experts Group (MPEG) Audio Layer 3 (MP3) digital camcorder, camera, and so on. The digital devices are equipped with image means for providing a user with information. The image means can use a liquid crystal display (LCD), plasma display panel (PDP), and so on. The image means can provide various types of image information such as text, still images, motion images, etc.

The perception of a human being undergoes variation in sensitivity, i.e., light-adapted sensitivity, in which luminance, chroma, and so on of an image perceived from the image means are different according to different possible luminance levels in ambient illumination. Luminance refers to the amount of light in a particular area. Chroma, which is short for "chrominance," includes hue and saturation. Hue is the dominant wavelength of a color. Saturation refers to the amount of black a color contains.

The variation in sensitivity due to light adaptation affords vision of a given image in, for example, a relatively dark, or low chroma, level although the actual optical characteristics of the given image are not configured to be responsive to background illumination from around the image means.

Although recent digital devices are highly integrated to achieve small size, be lightweight, and offer multiple functions, and provide users with the convenience of various information and functions the user, problematically, does not acquire, or incorrectly acquires, information from the image means adjusted for variation in external background illumination.

When, for example, the digital devices are used in an outdoor area, the user may, due to the variation in external background illumination, perceive luminance and chroma of an image differently from the actual luminance and chroma, i.e., that associated with the image without regard to ambient light influences. As a result, the user may perceive, in bright daylight for example, an image provided from the digital device at a darker level than that of ambient background illumination. Accordingly, the desired information is not acquired. In addition, the color human vision perceives may vary with ambient light. This variation is termed flare. When a flare phenomenon occurs due to light reflected from the display screen of the device, image information is not smoothly acquired. More particularly, the user incorrectly perceives an image, from the screen giving rise to the flare phenomenon, in a relatively low chroma state as compared with a normal state.

SUMMARY OF THE INVENTION

It is, therefore, an object of the present invention to provide a method for compensating luminance and chroma of a portable display apparatus according to variation of background illumination in an outdoor area. The method considers the adaptation of human visual sensitivity based on variation of the background illumination in the outdoor area. Also provided is an apparatus using the method.

In accordance with an aspect of the present invention, there is provided a method for compensating an image in image means for implementing image information, by taking account of ambient illumination. Measurement is made of luminance of the external background illumination around the image means. The measured luminance of the background illumination is compared with preset tristimulus values and a reflectance factor of the image means. A comparison result is computed. A control signal is generated for compensating luminance and chroma of the image.

BRIEF DESCRIPTION OF THE DRAWINGS

The above and other objects and aspects of the present invention will be more clearly understood from the following detailed description taken in conjunction with the accompanying drawings, in which.

DETAILED DESCRIPTION

Preferred embodiments of the present invention are described in detail herein below with reference to the accompanying drawings. In the following discussion, detailed descriptions of functions and configurations incorporated herein that are well known to those skilled in the art are omitted for clarity and conciseness.

Although a human being receives image information produced, for conveyance, with predetermined optical characteristics from the image means of a device, his or her perception of the image information may differ, according to the ambient environment. The difference results from variation in human visual sensitivity according to ambient background illumination. Conventional outdoor background illumination extends over a range spanning from about zero to $10^8$ candelas per square meter ($cd/m^2$), and the human perception range is about $10^5$ $cd/m^2$ in length.

Figure 1A:
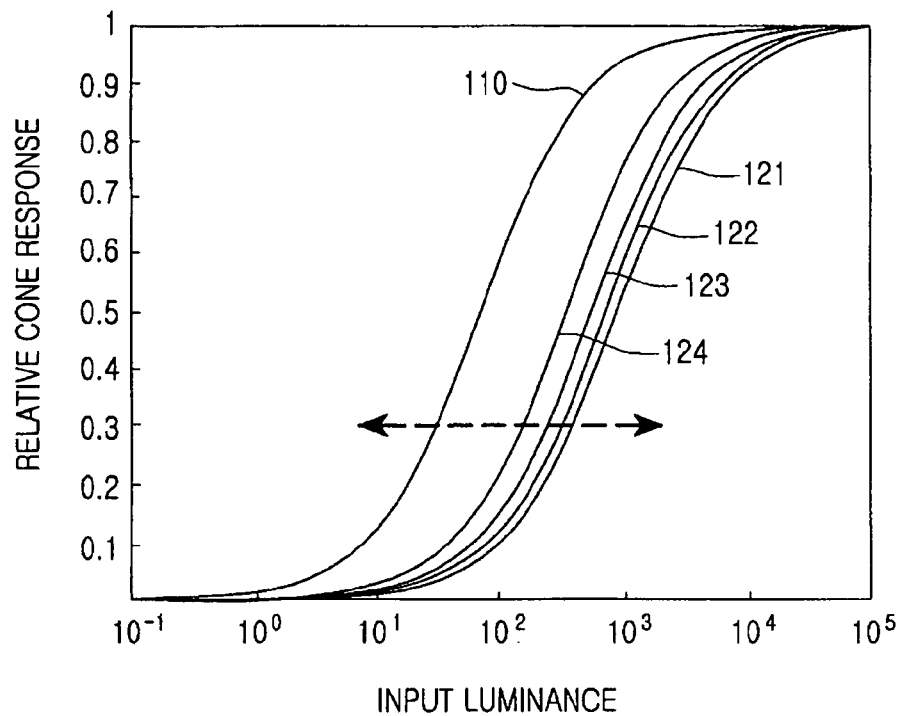
FIGS. 1A and 1B are graphs illustrating a comparison between visual sensitivity variations according to luminance variations of background illumination.

FIG. 1A illustrates sensitivity variation characteristics according to variation of ambient background illumination of a digital device. A first curve 110 indicates the case where a luminance value of the background illumination is 200 $cd/m^2$, a typical indoor value, and indicates visual sensitivity variation for an image at the indicated foreground luminance. Second to fifth curves 121, 122, 123, 124 have luminance values of 2,000 $cd/m^2$, 4,000 $cd/m^2$, 6,000 $cd/m^2$, and 8,000 $cd/m^2$ in the background illumination, respectively.

Figure 1B:
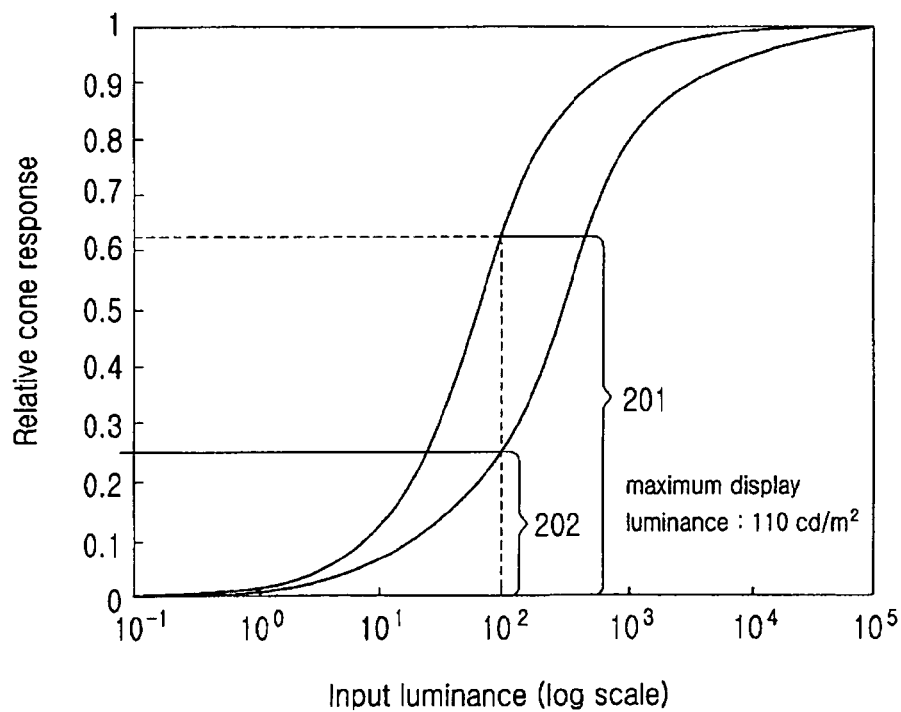

FIG. 1B compares visual sensitivity variation on the first and second curves 110, 124. It can be seen that visual sensitivity 201 in the indoor area is 0.6 in 100 $cd/m^2$, whereas visual sensitivity 202 is between 0.2 and 0.3 in 100 $cd/m^2$ in the case where the background illumination is increased while keeping foreground illumination constant.

The reason why, in spite of the relatively higher background illumination in the outdoors, a digital device or image means is still perceivable is, as described above, that human visual sensitivity, i.e., in cones which are structures in the human eye, is varied due to a light adaptation phenomenon. This is a factor that varies a cone response curve according to variation of external background illumination as illustrated in FIGS. 1A and 1B.

Figure 2:
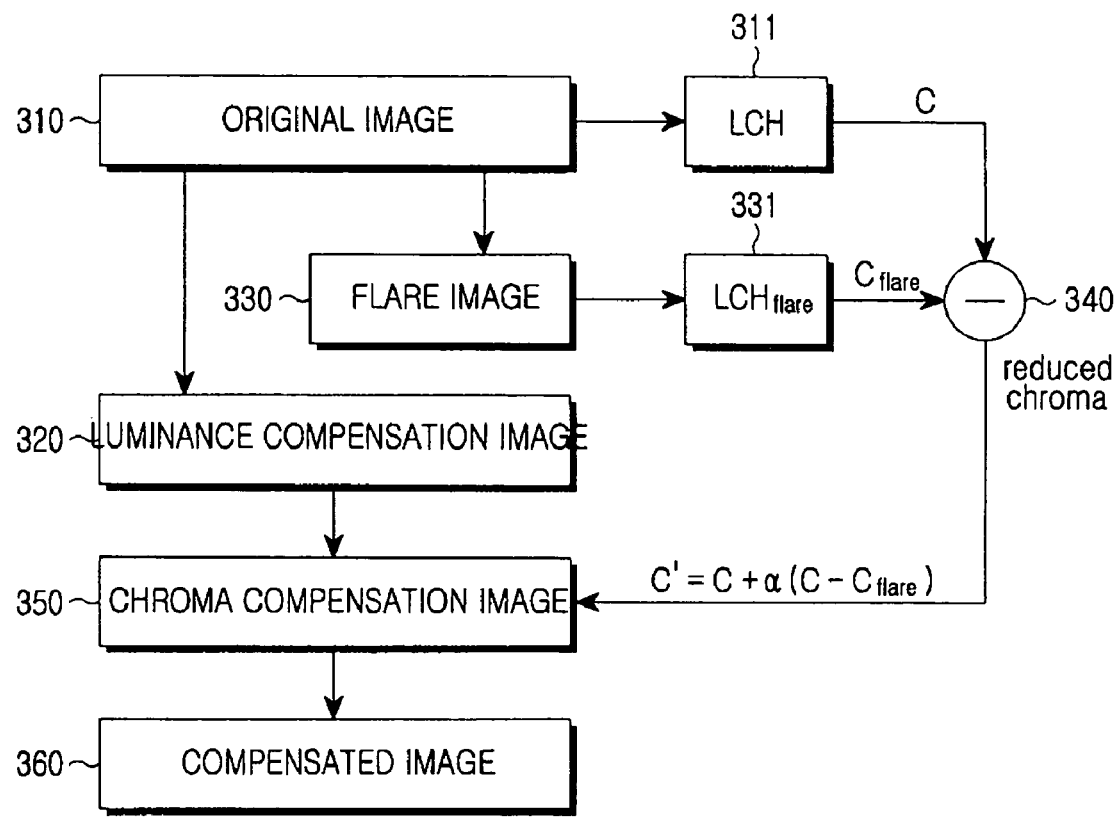
FIG. 2 is a flow diagram illustrating a process for compensating luminance and chroma of an image according to variation of background illumination in accordance with a first embodiment of the present invention.

FIG. 2 is a block diagram showing, by way of illustrative and non-limitative example, an image compensation method in a digital device in accordance with the present invention. The image means receives readings for red, green, and blue (RGB) in binary data values and implements an image. The RGB binary data cannot regularly adhere to a color sense based on the human visual sensitivity. An RGB function has at least one negative (−) value in computation of RGB values. The negative value represents removing that color component from a mixture, which removal may have no physical realization. Due to the negative value, the RGB gamut is limited, i.e., not all color light components cannot be made through a mixture of the three primary colors RGB. Specifically, a cathode ray tube (CRT), liquid crystal display (LCD), plasma display panel (PDP), and so on conventionally used in indoors can perform transformation using gain-offset-gamma (GOG) and S-curve models. However, a significant error occurs in a measurement result using a modeling function in the case of the image means applied to the portable digital device. A process for transforming three primary colors of RGB to tristimulus values X, Y, and Z defined in the International Commission on Illumination (CIE) in piecewise linear interpolation is described further below.

Referring to FIG. 2, the image compensation method in the digital device in accordance with this embodiment includes a first process 310 and 311 for detecting luminance, Chroma value and LCH based on a color space CIE/L*a*b*, a second process 330 compensating luminance 320 and detecting varied LCH of an image in which the flare phenomenon has occurred due to compensating luminance 320, a third process 340 detecting a difference between each chroma value detected at the first and second process and the tristimulus value (X,Y,Z) in a darkroom, and a fourth process (350) compensating the change of chroma value.

More particularly, the first process 310, 311 detects the luminance, chroma, and hue (LCH) in a International Commission on Illumination Lab uniform color space (CIE/L*a*b*) from an image subjected to external background illumination in a normal state, i.e., illumination that amounts to that which would be received in a dark room.

The first process 310, 311, and 320 detects LCH from an image in a reference state without external background illumination, e.g., in a dark room, and an image in the case where the external background illumination is present. It computes tristimulus values X, Y, and Z, in the case without external background illumination, which are then mapped to the user's sensitivity curve varied based on the external background illumination. The mapping produces a computed sensitivity curve. The computed sensitivity curve is transformed to a CIELAB color space to compensate luminance. According to a predefined standard, the tristimulus values are transformed for the three primary colors as described above.

Equation (1) is used to compute tristimulus values of an image implemented in the image means according to the external flare.

$$\begin{vmatrix} X \\ Y \\ Z \end{vmatrix}_D = \begin{vmatrix} X \\ Y \\ Z \end{vmatrix}_P + \begin{vmatrix} X \\ Y \\ Z \end{vmatrix}_I + \begin{vmatrix} X \\ Y \\ Z \end{vmatrix}_E \qquad \text{Equation (1)}$$

In Equation (1), the column matrix D on the left side of the equation indicates final tristimulus values perceived by the user through the image means of the digital device. The matrix P, leftmost on the right side of the equation, provides reference tristimulus values capable of being perceived by the user through the image means in a state in which the external background illumination is absent. The matrix I indicates tristimulus values according to flare due to an internal factor of the image means. The matrix E represents tristimulus values according to flare due to an external factor of the image means.

In Equation (1), the internal tristimulus values are negligibly small values in comparison to the external tristimulus values, and are negligible because variation is made according to a neighbor pixel value. A pixel is a minimum unit forming an image and contains image information. A set of pixels implements one image. That is, an arbitrary pixel can be affected and varied by flare due to other, neighboring pixels.

The external background illumination causes the flare phenomenon of an image. The above-described flare phenomenon plays a role in improving luminance. However, the flare phenomenon entails a light adaptation problem in which an image of the image means in the outdoor area is darker than the background illumination when the image means is viewed in the outdoor area.

Figure 5A:
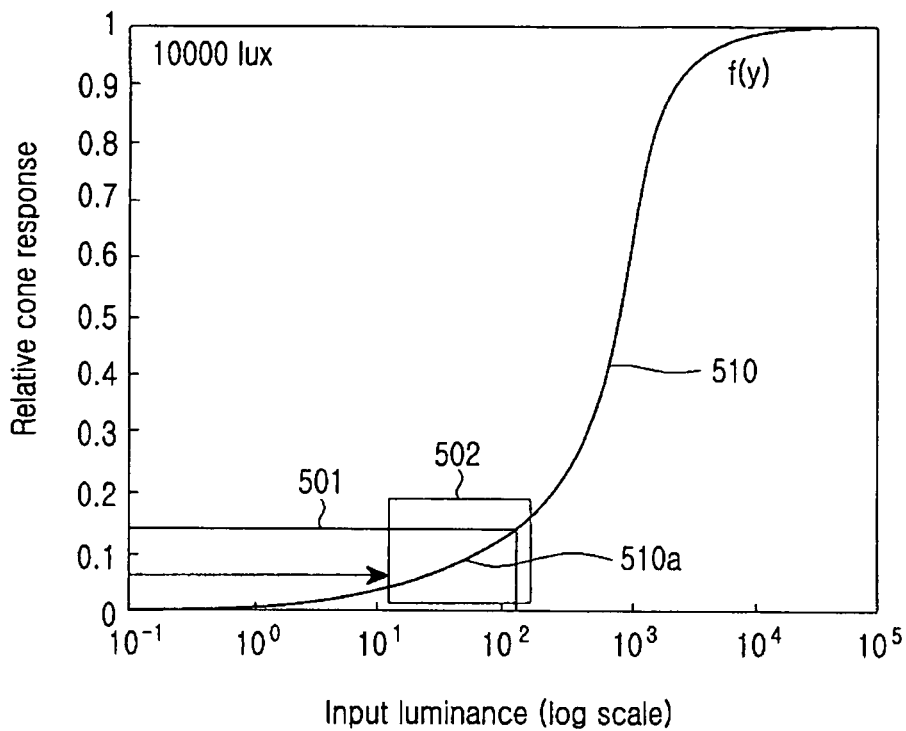
FIGS. 5A and 5B are graphs illustrating a correlation between luminance and visual sensitivity capable of being perceived by a human being.
Figure 5B:
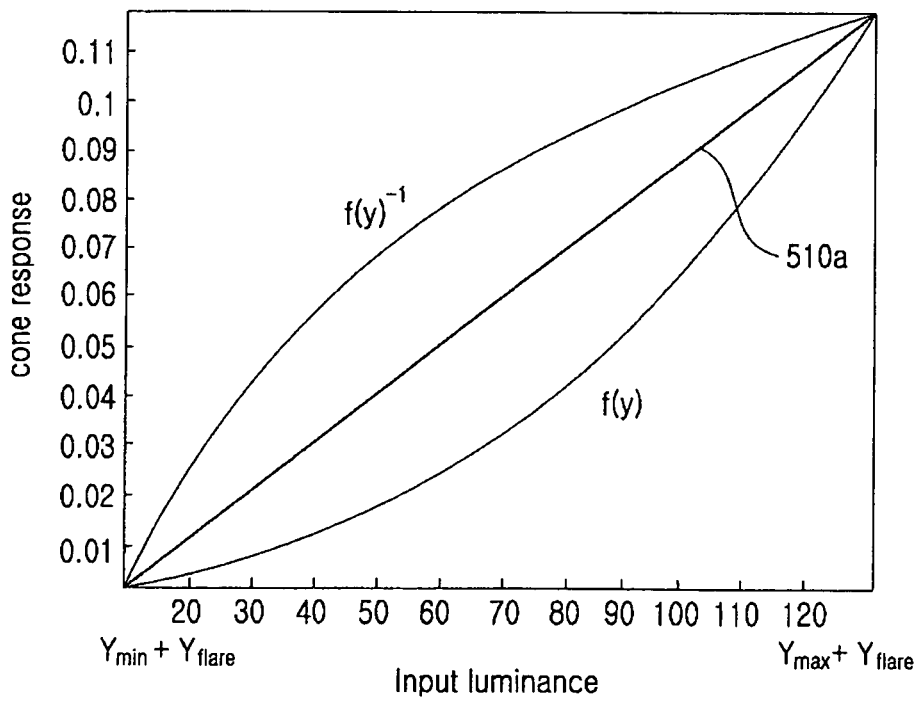

FIGS. 5A and 5B are graphs illustrating a correlation between luminance and visual sensitivity within the capability of human perception. In FIGS. 5A and 5B, the x-axis represents a light intensity and the y-axis represents a ratio of relative visual sense variation within human capability.

FIG. 5A is a graph illustrating a visual sense variation curve 510 in an outdoor environment of an associated image means when the background illumination is 10,000 lumens per square meter (lux). This indicates a state in which the sensitivity curve has been compensated to an optimal state due to the flare occurrence in the first reference state. That is, FIG. 5A illustrates the first sensitivity curve 510 varied to the optimal state in a position 501 of the sensitivity curve at the time of the first flare occurrence.

FIG. 5B is an enlarged graph illustrating a part 502 of FIG. 5A. Referring to FIG. 5B, it can be seen that a log function curve has a second sensitivity curve 510a of a linear form by creating an inverse function curve, i.e., mirror image, to the first sensitivity curve 510. This is illustrated in FIG. 5B according to Equation (2).

$$R_{cone} = f(Y) = \frac{Y^n}{Y^n + (I_A^\alpha \times \beta)^n} \quad \text{Equation (2)}$$

In Equation (2), $R_{cone}$ denotes a function of the first sensitivity curve 510 and is the same as the log function of $f(Y)$. Y denotes luminance of an image generated from the image means, which serves as one of the tristimulus values, and $I_A$ denotes luminance of ambient background illumination. α is 0.69, β is 3.98, and n can selectively be set to a value between 0.7~2.0.

As a result of the inverse function curve, visual sensitivity degradation due to the external flare phenomenon is compensated for.

In particular, the present invention computes an inverse function of a log function and adjusts luminance of an image generated from the image means, such that a response value of visual sensitivity is linearized and luminance loss of the image due to the background illumination can be compensated for.

Figure 6A:
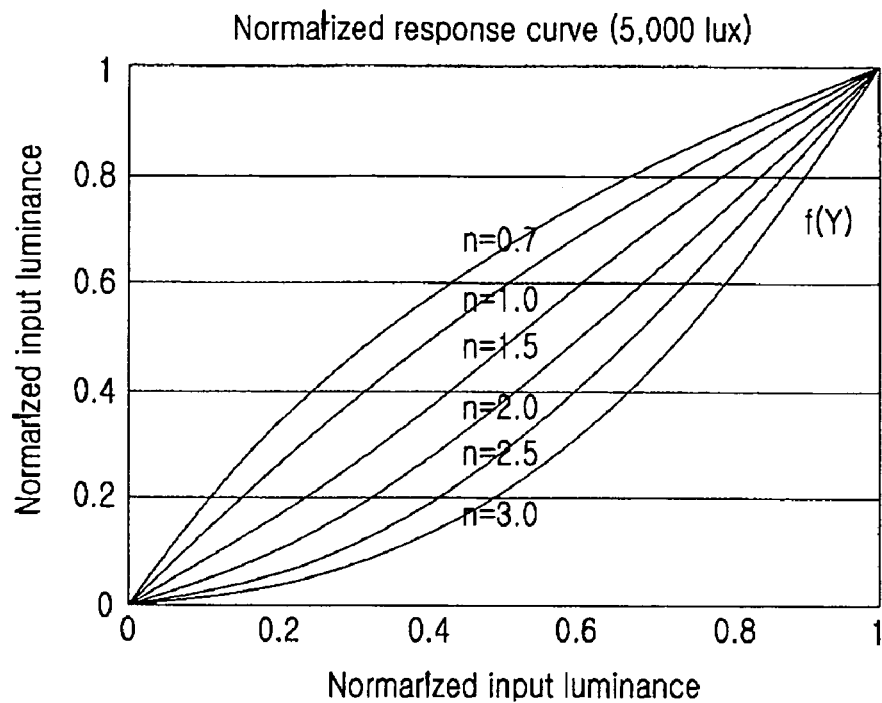
FIGS. 6A and 6B are graphs illustrating a curve form according to variation of an n value of a first sensitivity curve when background illumination is 5,000 lux and 10,000 lux.
Figure 6B:
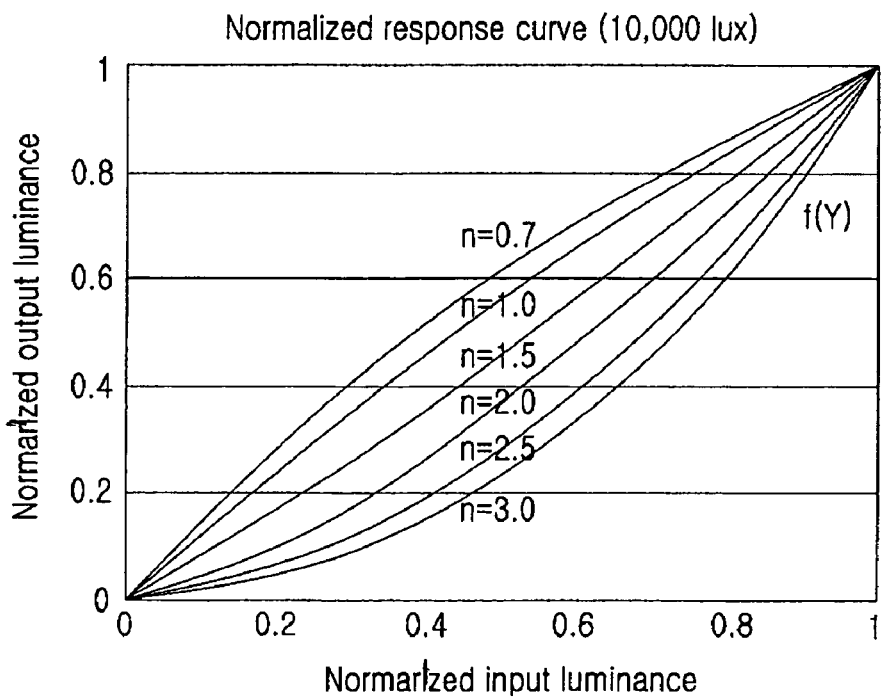

FIGS. 6A and 6B are graphs illustrating a curve form according to variation of the n value of the first sensitivity curve when the background illumination is 5,000 lux and 10,000 lux. Referring to FIGS. 6A and 6B, the first sensitivity curve becomes an exponential curve when the n value increases. When an inverse function of the first sensitivity curve and its value are computed, a linear visual sensitivity curve is formed such that a value of a low gradation region is largely increased, such that the effect of luminance enhancement can be maximized. It can be seen that the above-described n value can be experimentally set according to the image means.

The above-described low gradation region indicates a relatively dark part and indicates the case where the input luminance of the FIGS. 6A and 6B is less than 0.5. When the n value is large and the input luminance is small, luminance obtained by using the inverse function of the first sensitivity curve can be significantly improved.

Figure 3A:
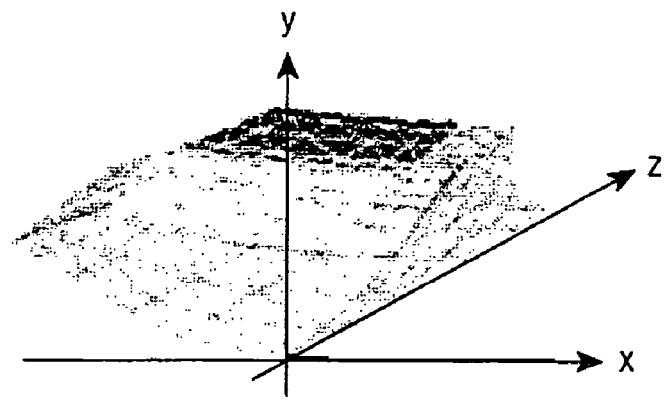
FIGS. 3A and 3B are three-dimensional graphs illustrating a comparison between an image in a dark room and an image in which a flare phenomenon has occurred.
Figure 3B:
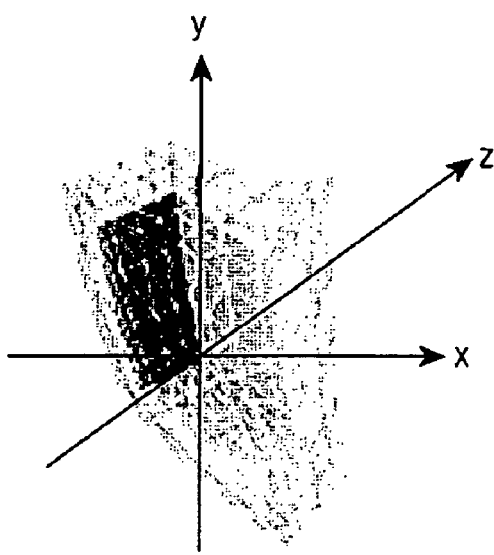

FIG. 3A is a three-dimensional graph illustrating an image of a reference state. The screen of FIG. 3A has a uniform distribution on the whole. FIG. 3B is a three-dimensional graph illustrating an image in which the flare phenomenon has occurred due to artificial luminance compensation. Referring to FIGS. 3A and 3B, it can be seen that chroma is degraded because the luminance of an overall region of the image becomes high but the luminance of an outer region of the image becomes low, when the luminance is enhanced. Referring to only the chroma of FIG. 3B, it can be seen that the chroma of all colors is not equally degraded, but the chroma of green is degraded as compared with that of red. Thus, chroma loss must be compensated for on the basis of different color values.

In FIGS. 3A and 3B, is CIELAB color space is shown in which the x-axis represents a*, the y-axis represents L*, and the z-axis represents b*. A value of a* is a red or green value. More specifically, the value of a* is the red value when it is positive and the value of a* is the green value when it is negative. A value of b* is a yellow or blue value. That is, the value of b* is the yellow value when it is positive and the value of a* is the blue value when it is negative. All colors have respective luminance values. Information of all the color cannot be expressed using a*b*. Information of all the colors of the image implemented by the image means from a relation with L* (luminance) of the vertical axis can be expressed in the three dimensions. In particular, L* represents the luminance and a*b* represents the color. A coordinate system illustrated in FIG. 3 can express an average difference capable of being perceived by the human eye. A relation between a*b* and XYZ conforms to a rule of the CIE 1976 L*a*b* color space.

As mentioned above, the first process 310, 311 compensates the user's visual sensitivity for relative luminance loss of the image means due to the background illumination, but has a problem in that the chroma of the image is degraded. The second process 330 compensating luminance 320 and detecting varied LCH of an image in which the flare phenomenon has occurred due to compensating luminance 320. The third and fourth processes 340, 350 are used to compensate for the above-described chroma degradation. In particular, tristimulus values of the image generated from the image means are measured when the digital device is operated in a state in which external background illumination is absent, as in the dark room, and tristimulus values according to luminance of the external background illumination are measured as shown in the above Equations (1) and (2) of the present invention. A difference between the tristimulus values is reflected in the image means, such that the user's visual sense can be compensated when it is dark due to the external background illumination.

The second process 330, 331 can compute Equation (3) (shown below) from Equation (1), and detects varied LCH of an image in which the flare phenomenon has occurred due to the outdoor background illumination after the first process 310, 311, 320. The above-described tristimulus values can be determined according to an intensity of the external background illumination as shown in Table 1 further below. The second process can preset the luminance of the measured background illumination in relation to the tristimulus values through experimentation.

$$\begin{vmatrix} X \\ Y \\ Z \end{vmatrix}_E = R_{bk} \begin{vmatrix} X \\ Y \\ Z \end{vmatrix} = R_{bk} \frac{M}{\pi} \begin{vmatrix} x_{Ambient} \\ y_{Ambient} \\ 1 - x_{Ambient} - y_{Ambient} \end{vmatrix} \quad \text{Equation (3)}$$

Equation (3) defines tristimulus values according to the external flare computed by omitting tristimulus values according to the internal flare in Equation (1). In Equation (3), $x_{Ambient}$ and $y_{Ambient}$ denote chromaticity values of background illumination. M denotes illuminance of the background illumination. $R_{bk}$ denotes a reflectance factor in a screen of the image means. The conventional CRT screen has a reflectance factor of 3~5%. The reflectance factor of the LCD used in the indoor area is 0.5~1% and is lower than that of the CRT. $x_{Ambient}$ and $y_{Ambient}$ can be measured using a spectroradiometer.

The third process 340 compares chroma values computed in the first and second processes 310, 311, 320, 330, 331 and computes a difference between the chroma values. The third process 340 can be defined as shown in Equations (4) and (5).

$$C_{diff} = C - C_{flare} \quad \text{Equation (4)}$$

In Equation (4), $C_{diff}$ denotes a difference between a chroma value C in a normal state of the image measured in the dark room and a chroma variation value $C_{flare}$ after luminance compensation. Equation (5) indicates compensated image chroma.

$$C' = C + \alpha C_{diff} \quad \text{Equation (5)}$$

In Equation (5), C' denotes the compensated chroma and a denotes a weight. The weight α is a constant for preventing the chroma of an associated color from exceeding a gamut, and can be determined by Equations (6) and (7).

$$\alpha = 1, \text{ if } C < (C_{gamut} - \beta \times C_{diff}) \quad \text{Equation (6)}$$

$$\alpha = \frac{(C_{gamut} - C)}{\beta \times C_{diff}} \quad \text{Equation (7)}$$

In Equations (6) and (7), $C_{gamut}$ denotes a boundary part of the gamut and β is a variable for selecting a point in which an addition operation based on the magnitude of the varied chroma is not performed. β can use one value of 1, 1.5, and 2. When a value of more than 2 is selected, the chroma is not smoothly improved. When a value of less than 1 is selected, the chroma is easily saturated. β can be selected according to states and conditions of each image means through a plurality of experiments.

The weight α is a constant for preventing the saturation of chroma according to the chroma compensation. The chroma is compensated by reduced chroma when the weight α is 1 as shown in Equation (6). Because an image with high chroma may exceed the gamut, a difference value is added within the gamut as shown in Equation (7). The value is gradually reduced according to the weight in the boundary part of the gamut, such that the saturation of chroma can be minimized.

Figure 4:
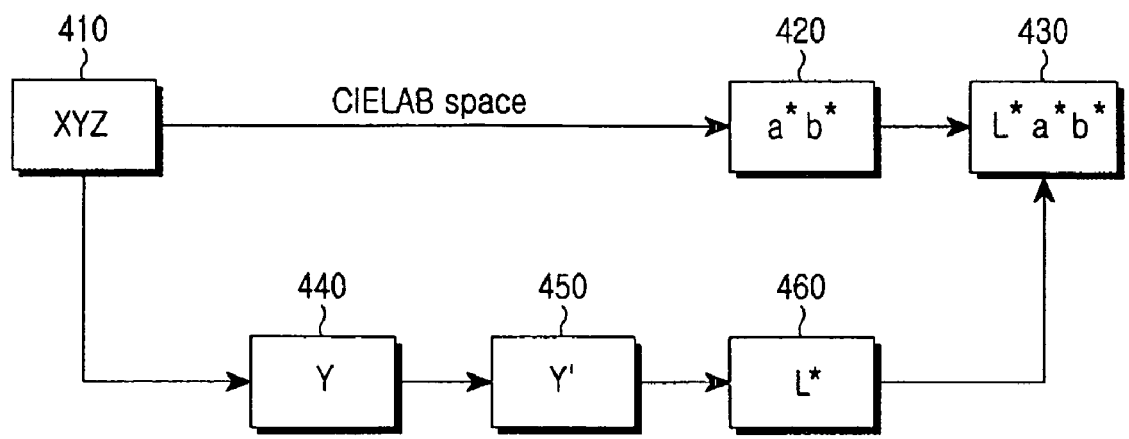
FIG. 4 is a block diagram illustrating steps of second to fourth processes in accordance with the first embodiment of the present invention.

FIG. 4 is a block diagram illustrating steps of the second to fourth processes in accordance with the first embodiment of the present invention. Next, the step of compensating chroma of an image will be described. Tristimulus values X, Y, and Z of the image can be computed from an intensity of the background illumination (410 and Table 1). X and Z of the computed tristimulus values can be transformed to a*b* according to the CIELAB color space (420). Y indicates luminance of the image (440) and varied luminance Y' is computed (450). Y' can be transformed to L* according to the CIELAB color space.

After L*a*b* based on the CIELAB color space is combined, a combination result is reflected to image compensation.

Figure 7:
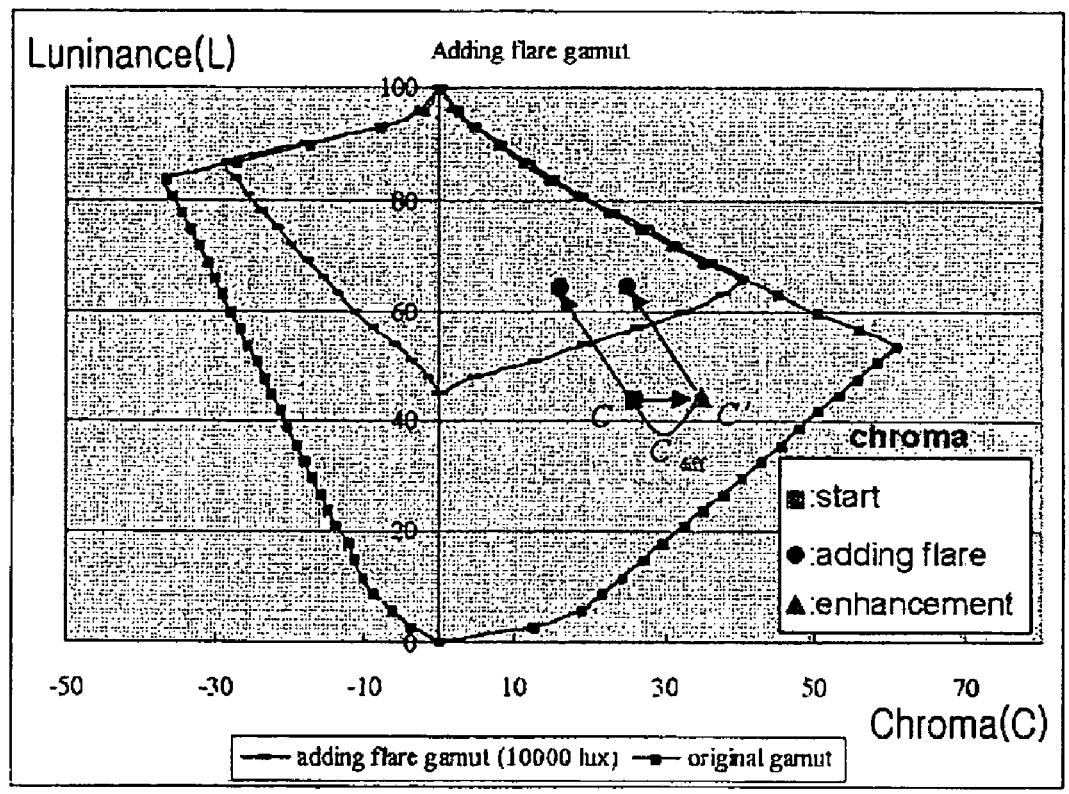
FIG. 7 is a graph illustrating chroma variation according to a flare phenomenon and a chroma enhancement method.

FIG. 7 is a graph illustrating chroma variation according to a flare phenomenon and a chroma enhancement method. The x-axis of the graph represents chroma, and the y-axis of the graph represents luminance. Polygonal graphs represent a color boundary, respectively. The color boundary of a wider range represents a color boundary of an image in which the flare phenomenon does not occur. The color boundary of a narrower range represents a color boundary of an image in which chroma has been compensated due to the flare phenomenon. The chroma can be suitably maintained even when outdoor background illumination is present after the chroma of $C_{diff}$ is compensated as illustrated in FIG. 7.

Table 1 shows tristimulus values of the external flare according to the external background illumination and data obtained by measuring a reflectance factor of the image means.

TABLE 1

| Illuminance of Background Illumination | X | Y | Z | $R_{bk}$ |
|---|---|---|---|---|
| 0 lux | 0.52 | 0.47 | 0.77 | |
| 500 lux | 1.78 | 1.91 | 2.63 | 0.008 |
| 4,000 lux | 12.76 | 13.5 | 14.63 | 0.01 |

TABLE 1-continued

| Illuminance of Background Illumination | X | Y | Z | $R_{bk}$ |
|---|---|---|---|---|
| 9,000 lux | 29.20 | 30.4 | 39.73 | 0.01 |
| 15,000 lux | 47.92 | 49.5 | 59.7 | 0.011 |

Table 1 shows a result obtained by experimentally computing variation values of the tristimulus values according to the intensity of the background illumination. The image means can experimentally produce Table 1 according to characteristics.

Figure 8:
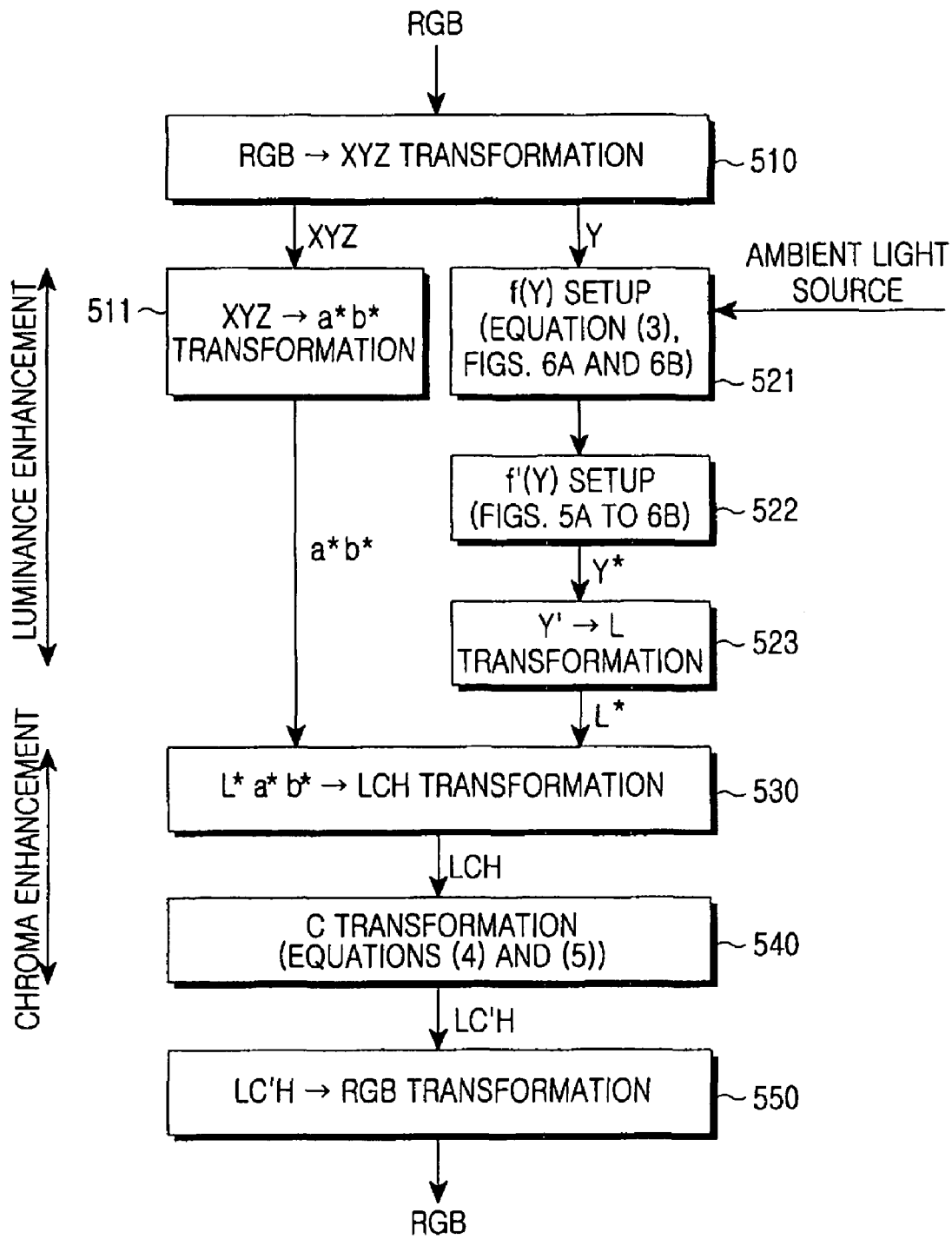
FIG. 8 is a block diagram illustrating an algorithm in accordance with a second embodiment of the present invention.

FIG. 8 is a block diagram illustrating an algorithm in accordance with a second embodiment of the present invention. Referring to FIG. 10, the luminance and chroma improvements in accordance with this embodiment are achieved through two steps. The algorithm transforms data input in a system of three primary colors (RGB) to tristimulus values (Step 510). The tristimulus values X, Y, and Z set a sensitivity curve (associated with Equation (2) and $f(Y)$ of FIGS. 6A and 6B) (Step 521), and the tristimulus values are transformed to a*b* (Step 511).

The sensitivity curve (associated with $f(Y)$ and FIGS. 5A to 6B) is transformed by a mirror-image inverse function $f'(Y)$ (Step 522). Y' of the tristimulus values of the inverse function is transformed to L* (Step 523).

After steps 523 and 511, a*b* and L* are transformed to LCH (Step 530). According to transformation of C, LCH is transformed to LC'H according to Equations (4) and (5) (Step 540). LC'H is transformed to RGB, such that RGB is output.

In accordance with an embodiment of the present invention, the image means of the digital device can include an optical detector for detecting an intensity of external background illumination, an operator for storing variation values of tristimulus values according to the intensity of the external background illumination detected in the optical detector, comparing the intensity of the background illumination with the stored variation values of the tristimulus values, and computing a control signal, and a controller for compensating an image of the image means on the basis of a value computed in the operator.

Portable digital devices are widely used because they are conveniently portable, but conventionally have a problem in that an image implemented through image means such as an LCD panel corresponding to main means for providing information does not provide a user with information according to luminance of external illumination. However, the present invention measures the luminance of the external illumination and compensates luminance and chroma on the basis of a measurement result, such that the user can acquire image information in a constant state even when an external illumination state is varied.

What is claimed is:

1. A method for compensating an image, comprising:
   measuring luminance of external background illumination around an image means for implementing image information in said image to be compensated;
   comparing by a controller the measured luminance of the external background illumination with preset tristimulus values and a reflectance factor of the image means from a memory; and
   computing a result of said comparing and generating at least one control signal for compensating display by the image means; and
   compensating luminance and chroma displayed by the image means in response to the control signal,
   wherein the compensation of the chroma depends on $C'=C+\alpha C_{diff}$, where C is reference chroma of the image measured in a dark room, $C_{diff}=C-C_{flare}$ is varied chroma, and $\alpha$ is a weight according to chroma variation.

2. The method of claim 1, wherein the tristimulus values and the reflectance factor according to the luminance of the background illumination satisfy an equation of:

$$\begin{vmatrix} X \\ Y \\ Z \end{vmatrix}_E = R_{bk} \begin{vmatrix} X \\ Y \\ Z \end{vmatrix} = R_{bk} \frac{M}{\pi} \begin{vmatrix} x_{Ambient} \\ y_{Ambient} \\ 1 - x_{Ambient} - y_{Ambient} \end{vmatrix},$$

where E is the luminance of the external background illumination, X, Y, and Z are the tristimulus values of the image, $x_{Ambient}$ and $y_{Ambient}$ are transformation values of tristimulus values of the external background illumination, $R_{bk}$ is the reflectance factor of the image, and M is illuminance of the background illumination.

3. The method of claim 2, wherein the reflectance factor of the image depends on $$R_{cone} = f(Y) = \frac{Y^n}{Y^n + (I_A^\alpha \times \beta)^n},$$

where $R_{cone}$ and $f(Y)$ are functions of a sensitivity curve, $I_A$ is luminance of the background illumination, Y is the luminance of the image, $\alpha$ is 0.69, $\beta$ is 3.98, and n is a constant selectively used from a value between 0.7~2.0, and wherein the luminance of the image according to the luminance of the external background illumination is compensated by forming an inverse function of the function $f(Y)$.

4. The method of claim 1, wherein when a value obtained by subtracting chroma variation after flare occurrence from a boundary part of a gamut is less than the reference chroma, the weight $\alpha$ is determined as defined by:

$$\alpha=1, \text{ if } C<(C_{gamut}-\beta \times C_{diff}),$$

where $C_{gamut}$ is the boundary part of the gamut and $\beta$ is a variable.

5. The method of claim 1, wherein the weight $\alpha$ is determined by $$\alpha = \frac{(C_{gamut} - C)}{\beta \times C_{diff}}.$$

* * * * *